United States Patent
Friberg et al.

(10) Patent No.: US 12,300,408 B2
(45) Date of Patent: May 13, 2025

(54) POWER CABLE WITH BIMETALLIC CONDUCTOR

(71) Applicant: NKT HV Cables AB, Lyckeby (SE)

(72) Inventors: Peter Friberg, Rödeby (SE); Robert Wayne Hobson, Cary, NC (US); Evripidis Karatsivos, Karlskrona (SE)

(73) Assignee: NKT HV Cables AB, Lyckeby (SE)

( * ) Notice: Subject to any disclaimer, the term of this patent is extended or adjusted under 35 U.S.C. 154(b) by 142 days.

(21) Appl. No.: 18/057,518

(22) Filed: Nov. 21, 2022

(65) Prior Publication Data
US 2024/0170184 A1   May 23, 2024

(51) Int. Cl.
*H01B 9/04* (2006.01)
*H01B 1/00* (2006.01)
*H01B 9/00* (2006.01)
*H02G 1/00* (2006.01)

(52) U.S. Cl.
CPC ............... *H01B 9/04* (2013.01); *H01B 1/00* (2013.01); *H01B 9/006* (2013.01); *H02G 1/005* (2013.01)

(58) Field of Classification Search
CPC ... H01B 1/00; H01B 1/02; H01B 7/02; H01B 7/04; H01B 7/14; H01B 7/22; H01B 7/225; H01B 7/26; H01B 7/2806; H01B 9/02; H01B 9/025; H01B 9/04; H01B 9/006; H01B 13/26; H02G 1/005; H02G 1/14; H02G 15/14; H02G 15/18; H02G 15/007; H01R 4/02; H01R 4/62; H01R 43/02
USPC ............................................ 174/102 R–108
See application file for complete search history.

(56) References Cited

U.S. PATENT DOCUMENTS

| | | | |
|---|---|---|---|
| 4,169,426 A | * | 10/1979 | Kornmann ............ C23C 2/0035 118/69 |
| 10,580,552 B2 | * | 3/2020 | Gogola ...................... C23C 2/06 |
| 2001/0016103 A1 | * | 8/2001 | Hoch ....................... H01B 7/14 385/107 |
| 2012/0024565 A1 | * | 2/2012 | Orini ........................ H02G 1/10 174/106 R |

(Continued)

FOREIGN PATENT DOCUMENTS

| | | | | |
|---|---|---|---|---|
| EP | 3139443 A1 | * | 3/2017 | ............... H01R 4/02 |
| EP | 3644326 A1 | * | 4/2020 | ............. H01B 13/06 |
| WO | 2020116721 A1 | | 6/2020 | |

OTHER PUBLICATIONS

Extended European Search Report; Application No. 23211004.9; Completed: Mar. 19, 2024; Issued: Mar. 28, 2024; 5 Pages.

*Primary Examiner* — William H. Mayo, III
(74) *Attorney, Agent, or Firm* — Whitmyer IP Group LLC

(57) ABSTRACT

A power cable includes a conductor having a first section, a second section, and a weld metal located axially between the sections. The first section includes a central element made of a first metal and an outer structure made of a second metal surrounding the central element. The second section includes the second metal. An axial end section of the first section extends to the weld metal and includes a central axially extending member surrounded by the outer structure, wherein the member includes a first axial part made of the first metal and a second axial part made of the second metal. The first axial part has a first end welded to the central element and a second end welded to a first end of the second axial part. A second end of the second axial part and the outer structure are welded to the second section via the weld metal.

17 Claims, 2 Drawing Sheets

(56) References Cited

U.S. PATENT DOCUMENTS

2015/0170795 A1\* 6/2015 Maioli ................... H01B 9/025
                                                                174/108

\* cited by examiner

POWER CABLE WITH BIMETALLIC CONDUCTOR

TECHNICAL FIELD

The present disclosure generally relates to power cables with a bimetallic conductor.

BACKGROUND

Some power cables have bimetallic conductors, i.e., conductors comprising two different metal materials. Often, these materials are copper and aluminium. The reason to use two materials may be due to costs, as for example in AC applications the centre of the cable does not carry much current due to the skin effect.

It may be challenging to join a bimetallic conductor with another conductor, especially because of difficulties in welding different metallic materials.

SUMMARY

In view of the above an object of the present disclosure is to provide a power cable which solves or at least mitigates the problems of the prior art.

There is hence according to a first aspect of the present disclosure provided a power cable comprising: a conductor comprising: a first conductor section comprising an elongated first central element made of a first metal and a first outer metal structure made of a second metal surrounding the first central element, a second conductor section comprising the second metal, a weld metal located axially between the first conductor section and the second conductor section, wherein the first conductor section has a first axial end section extending to the weld metal, wherein the first axial end section comprises: a central axially extending first metal member surrounded by the first outer metal structure, the first metal member including a first axial part made of the first metal and a second axial part made of the second metal, wherein the first axial part has a first end that is welded to the first central element and a second end that is welded to a first end of the second axial part, and wherein the second axial part has a second end, wherein the second end of the second axial part and the first outer metal structure are welded to the second conductor section by means of the weld metal.

The bimetallic first conductor section thus transitions into a section that comprises only the second metal at the interface that is welded to the second conductor section, which comprises the second metal. This facilitates jointing of the first conductor section with the second conductor section.

The second conductor section may in particular comprise only the second metal at the interface which is in direct contact with the weld metal.

According to one embodiment the second end of the first axial part is friction welded to the first end of the second axial part.

According to one embodiment the first metal is aluminium.

According to one embodiment the second metal is copper.

According to one embodiment the first outer metal structure comprises a plurality of elongated elements arranged in one or more layers around the first central element.

According to one embodiment the weld metal has a V-shape between the first conductor section and the second conductor section.

According to one embodiment the second conductor section is solid and comprises copper, or wherein the second conductor section consists of a plurality of elongated conducting elements, wherein all the conducting elements comprise copper.

According to one embodiment the second conductor section comprises an elongated second central element made of the first metal and a second outer metal structure made of the second metal surrounding the second central element.

According to one embodiment the second conductor section has a second axial end section extending to the weld metal, wherein the second axial end section comprises: a central axially extending second metal member surrounded by the second outer metal structure, the second metal member including a first axial part made of the first metal and a second axial part made of the second metal, wherein the first axial part has a first end that is welded to the second central element and a second end that is welded to a first end of the second axial part, and wherein the second axial part has a second end, wherein the second end of the second axial part and the second outer metal structure are welded to the first conductor section by means of the weld metal.

One embodiment comprises an insulation system comprising an inner semiconducting layer arranged around the conductor, including the weld metal, an insulation layer arranged around the inner semiconducting layer, and an outer semiconducting layer arranged around the insulation layer.

According to one embodiment the power cable is a high voltage power cable.

According to one embodiment the power cable is an AC power cable.

There is according to a second aspect provided a method of jointing a conductor of a power cable, the method comprising: a) providing a first conductor comprising a first conductor section comprising an elongated first central element made of a first metal and a first outer metal structure made of a second metal surrounding the first central element, and a second conductor comprising a second conductor section comprising the second metal, b) bending the first outer metal structure radially outwards in a first axial end section which forms an end portion of the first conductor section, c) cutting off an end section of the first central element radially inwards of where the first outer metal structure is bent radially outwards to obtain a first central element end face, d) providing a first metal member having a first axial part made of the first metal and a second axial part made of the second metal, e) welding a first end of the first axial part to the first central element end face, the first axial part having a second end welded to a first end of the second axial part, f) bending the first outer metal structure back radially inwards towards the first metal member, and g) welding the second end of the second axial part and the first outer metal structure to the second conductor section by means of a weld metal.

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
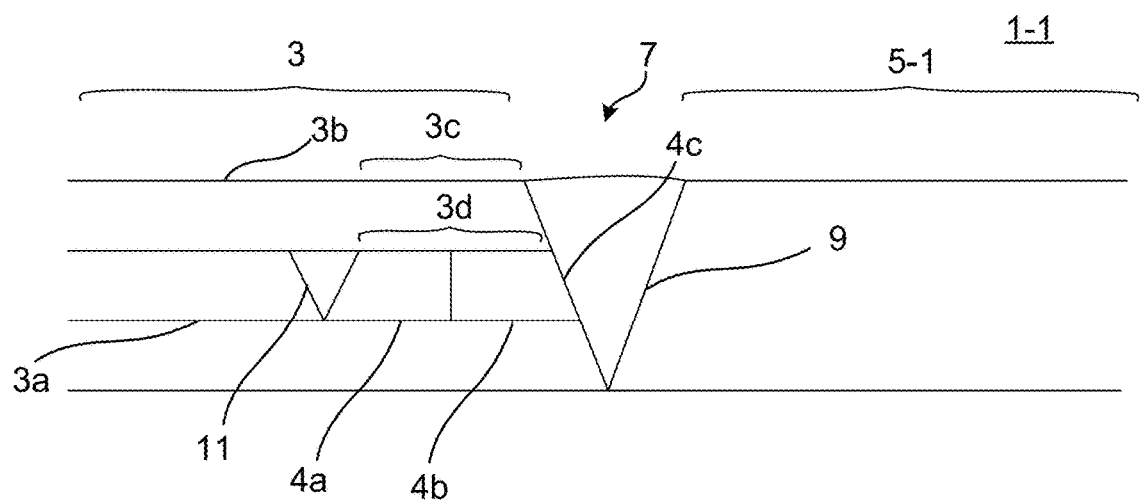
FIG. 1 schematically show a sideview of an example of a conductor of a power cable.

FIG. 1 schematically shows a sideview of an example of a conductor 1-1 provided with a conductor joint. The conductor 1-1 is a conductor of a power cable, such as an AC power cable. Only the conductor 1-1 of the power cable is in FIG. 1 shown for reasons of clarity.

The conductor 1-1 has a first conductor section 3 and a second conductor section 5-1.

The first conductor section 3 and the second conductor section 5-1 are joined via a conductor joint 7.

The first conductor section 3 comprises an elongated first central element 3a. The first central element 3a extends coaxially with a central longitudinal axis of the first conductor section 3.

The first central element 3a is made of a first metal. The first metal may typically be aluminium.

The first conductor section 3 comprises a first outer metal structure 3b surrounding the first central element 3a. The first outer metal structure 3b is a layer arranged radially outside of the first central element 3a.

The first outer metal structure 3b is made of a second metal. The second metal may typically be copper.

The first outer metal structure 3b may comprise a plurality of elongated elements arranged in one or more layers around the first central element 3a. The elongated elements may for example be stranded elongated elements. The elongated elements may for example have a round or a trapezoidal cross-section. The elongated elements may be arranged in segments. The first conductor section 3 may for example have a Milliken conductor structure.

The second conductor section 5-1 comprises the second metal. According to the example in FIG. 1, the second conductor section 5-1 is made of a single metal, i.e., the second metal. The exemplified second conductor section 5-1 does thus not comprise a bimetallic conductor. The second conductor section 5-1 may have the structure of any of solid or single strand conductor, a stranded round conductor, a profile wire conductor, also called a keystone conductor, or a Milliken conductor, for example.

The conductor 1-1 comprises a weld metal 9 axially between the first conductor section 3 and the second conductor section 5-1. The weld metal 9 joins the first conductor section 3 with the second conductor section 5-1. The weld metal 9 is solidified weld material used for welding the first conductor section 3 to the second conductor section 5-1. The weld material 9 comprises components that are adapted for welding of the second metal, e.g., copper.

The first conductor section 3 and the second conductor section 5-1 may during jointing be provided with a respective inclined end surface cut, with the inclined end surfaces facing each other before welding such that the weld metal 9 between the first conductor section 3 and the second conductor section 5-1 becomes V-shaped after the welding has been done.

The first conductor section 3 has a first axial end section 3c extending to the weld metal 9. The first axial end section 3c comprises a central axially extending first metal member 3d surrounded by the first outer metal structure 3b. The first metal member 3d has an axial extension radially inside the first outer metal structure 3b, from the first central element 3a to the weld metal 9.

The first metal member 3 comprises a first axial part 4a made of the first metal and a second axial part 4b made of the second metal. The first axial part 4a and the second axial part 4b may be welded to each. The welding may be by friction welding.

The first axial part 4a has a first end that is welded to the first central element 3a and a second end, which is opposite to the first end, that is welded to a first end of the second axial part 4b. The weld between the first axial part 4a and the first central element 3a may be made using a weld material 11 that in a solidified state forms a V-shaped joint between the first central element 3a and the first axial part 4a.

The second axial part 4b has a second end. The second end and the first outer metal structure 3b, both made of the second metal, are welded to the second conductor section 5-1 by means of the weld metal 9.

Figure 2:
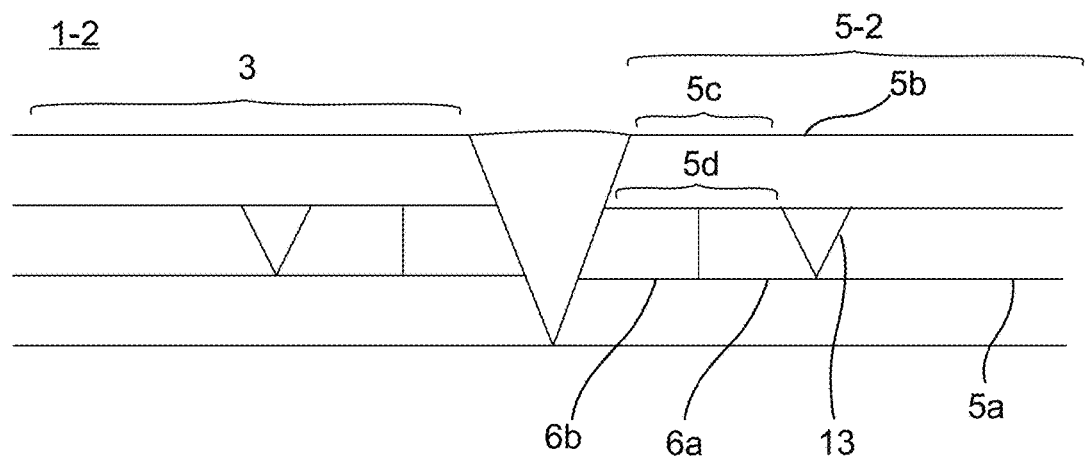
FIG. 2 shows a sideview of another example of a conductor of a power cable.

FIG. 2 shows another example of a conductor. The conductor 1-2 is similar to conductor 1-1. In particular, the first conductor section 3 and the weld metal 9 is identical to that of the conductor 1-1. The second conductor section 5-2 is in this example similar to or identical to the first conductor section 3.

The second conductor section 5-2 comprises an elongated second central element 5a. The second central element 5a is made of the first metal. The second central element 5a extends coaxially with a central longitudinal axis of the second conductor section 5-2.

The second conductor section 5-2 comprises a second outer metal structure 5b made of the second metal surrounding the second central element 5a. The second outer metal structure 5b is a layer arranged radially outside of the second central element 5a.

The second outer metal structure 5b may comprise a plurality of elongated elements arranged in one or more layers around the second central element 5a. The elongated elements may for example be stranded elongated elements. The elongated elements may for example have a round or a trapezoidal cross-section. The elongated elements may be arranged in segments. The second conductor section 5-2 may for example have a Milliken conductor structure.

The second conductor section 5-2 has a second axial end section 5c extending to the weld metal 9. The second axial end section 5c includes a central axially extending second metal member 5d. The second metal member 5d is surrounded by the second outer metal structure 5b.

The second metal member 5d includes a first axial part 6a made of the first metal and a second axial part 6b made of the second metal. The first axial part 6a has a first end that is welded to the second central element 5a and a second end that is welded to a first end of the second axial part 6b. The welding may be by friction welding. The weld between the first axial part 6*a* and the second central element 5*a* may be made using a weld material 13 that in a solidified state forms a V-shaped joint between the second central element 5*a* and the first axial part 6*a*.

The second axial part 6*b* has a second end. The second end of the second axial part 6*b* and the second outer metal structure 5*b* are welded to the first conductor section 3 by means of the weld metal 9.

Figure 3:
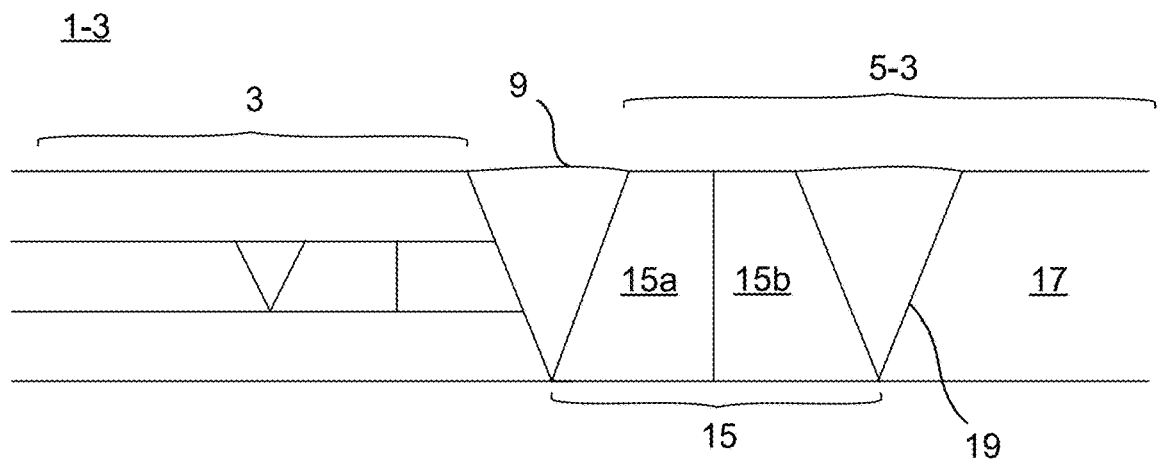
FIG. 3 is a sideview of yet another example of a conductor of a power cable.

FIG. 3 shows a sideview of another example of a conductor. The conductor 1-3 is similar to conductor 1-1. In particular, the first conductor section 3 and the weld metal 9 is identical to that of the conductor 1-1 and the conductor 1-2.

The second conductor section 5-3 differs from the second conductor sections 5-1 and 5-2 described above. According to the example in FIG. 3, the second conductor section 5-3 comprises a joint member 15, and a conductor part 17. The joint member 15 is arranged axially between the weld metal 9 and the conductor part 17.

The conductor part 17 is made of only the first material.

The joint member 15 comprises a first part 15*a* made of the second material, and a second part 15*b* made of the first material. The first part 15*a* and the second part 15*b* may be friction welded to each other.

The joint member 15 is welded to the first conductor section 3 by means of the weld metal 9. The first part 15*a* is welded to the first conductor section 3. The first part 15*a* is in direct contact with the weld metal 9.

The joint member 15 is welded to the conductor part 17. In particular, the second part 15*b* is welded to the conductor part 17. A second weld metal 19 is arranged between the second part 15*b* and the conductor part 17. The second weld metal 19 may be V-shaped, like the weld metal 9.

Figure 4:
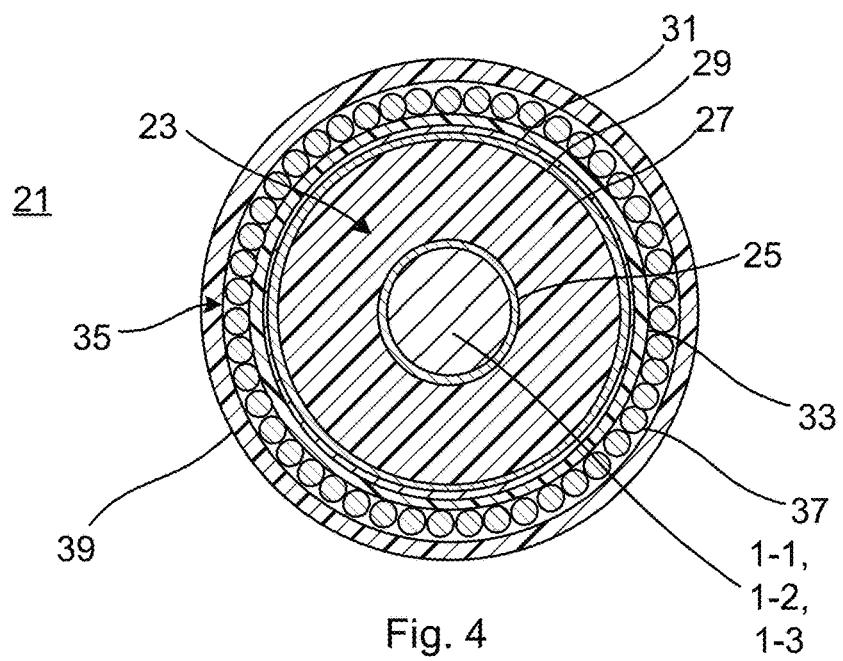
FIG. 4 is a cross-section of an example of a power cable provided with the conductor of any of FIGS. 1-3.

FIG. 4 shows an example of a power cable 21 comprising the conductor 1-1, 1-2, or 1-3. The power cable 21 may be a high voltage power cable. The power cable 21 may be an AC power cable.

The power cable 21 may be an underground, or land, power cable, or a submarine power cable.

According to the example in FIG. 4, the power cable 21 comprises an insulation system 23 arranged around the conductor 1-1, 1-2, 1-3.

The insulation system 23 is arranged around the first conductor section 3, the weld metal 9, and the second conductor section 5-1, 5-2, 5-3.

The insulation system 23 comprises an inner semiconducting layer 25 arranged around the conductor 1-1, 1-2, 1-3, an insulation layer 27 arranged around the inner semiconducting layer 25, and an outer semiconducting layer 29 arranged around the insulation layer 27.

The insulation system 23 may be an extruded insulation system comprising polymeric material, or a paper-based oil impregnated insulation system.

The power cable 21 may comprise a metallic sheath 31 arranged around the insulation system 23. The metallic sheath 31 may for example comprise copper, aluminium, stainless steel, various alloys of the aforementioned metals, or lead.

The power cable 21 comprises a polymeric sheath 33. The polymeric sheath 33 is arranged around the insulation system 23. In case the metallic sheath 31 is present, the polymeric sheath 33 is arranged around the metallic sheath 31.

The power cable 1 may additionally comprise one or more armour layers 35 comprising helically laid elongated armour elements 37, such as armour wires made of metal, e.g., galvanized steel, stainless steel, or copper, or polymeric material.

The power cable 1 comprises an outer layer 39, which is the outermost layer of the power cable 1.

The power cable could instead of being a single core power cable, as shown in the example in FIG. 4, be a multi-core power cable, e.g., a three-core power cable, where each power core comprises a conductor 1-1, 1-2, or 1-3.

Figure 5:
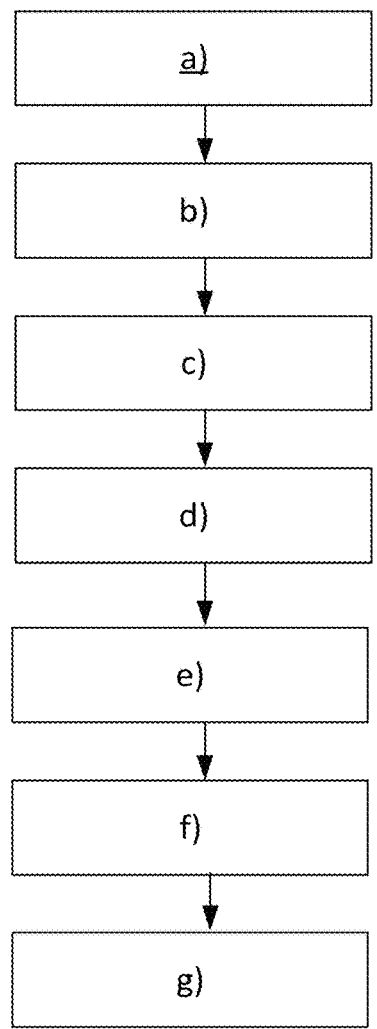
FIG. 5 is a flowchart of a method of jointing a conductor of a power cable.

FIG. 5 shows a method of jointing the conductor 1-1, 1-2, 1-3, i.e., jointing of the first conductor section 3 with the second conductor section 5-1, 5-2, 5-3. The joint may be a factory joint, i.e., a joint made in the factory before the power cable has been completed and involves vulcanising the insulation system over the conductor joint if it is a polymeric insulation system, or a prefabricated joint, which uses a prefabricated elastomeric sleeve to restore the insulation system over the conductor joint, and which is typically made out in the field on site or on a cable laying vessel.

In a step a) of the method, a first conductor comprising the first conductor section 3 comprising the first central element 3*a* extending all the way to the end of the first conductor is provided. Further, a second conductor comprising the second conductor section 5-1, 5-2, 5-3 is provided.

In a step b) the first outer metal structure 3*b* is bent radially outwards in the first axial end section 3*c*, which forms an end portion of the first conductor section 3. This typically involves bending the elongated elements of which the first outer metal structure 3*b* is formed, radially outwards.

In a step c) an end section of the first central element 3*a* is cut off radially inwards of where the first outer metal structure 3*b* is bent radially outwards, i.e., the first axial end section 3*c*, to obtain a first central element end face.

In a step d) the first metal member 3*d* is provided.

In a step e) a first end of the first axial part 4*a* is welded to the first central element end face. The first axial part 4*a* and the second axial part 4*b* have preferably already been welded to each other before step e) such as by friction welding.

In a step f) the first outer metal structure 3*b* is bent back radially inwards towards the first metal member 3*d*.

In a step g) the second end of the second axial part 4*b* and the first outer metal structure 3*b* are welded to the second conductor section 5-1, 5-2, 5-3 by means of the weld metal 9.

In the example in FIG. 2, both the first conductor section 3 and the second conductor section 5-2 are prepared in the same way before they are welded together in step g).

The inventive concept has mainly been described above with reference to a few examples. However, as is readily appreciated by a person skilled in the art, other embodiments than the ones disclosed above are equally possible within the scope of the inventive concept, as defined by the appended claims.

What is claimed is:

1. A power cable comprising:
    a conductor comprising:
        a first conductor section comprising an elongated first central element made of a first metal and a first outer metal structure made of a second metal surrounding the first central element,
        a second conductor section comprising the second metal,
        a weld metal located axially between the first conductor section and the second conductor section, wherein the first conductor section has a first axial end section extending to the weld metal, wherein the first axial end section comprises:
a central axially extending first metal member surrounded by the first outer metal structure, the first metal member including a first axial part made of the first metal and a second axial part made of the second metal,
wherein the first axial part has a first end that is welded to the first central element and a second end that is welded to a first end of the second axial part, and
wherein the second axial part has a second end, wherein the second end of the second axial part and the first outer metal structure are welded to the second conductor section by means of the weld metal.

2. The power cable as claimed in claim 1, wherein the second end of the first axial part is friction welded to the first end of the second axial part.

3. The power cable as claimed in claim 2, wherein the first metal is aluminium.

4. The power cable as claimed in claim 2, wherein the second metal is copper.

5. The power cable as claimed in claim 2, wherein the first outer metal structure comprises a plurality of elongated elements arranged in one or more layers around the first central element.

6. The power cable as claimed in claim 2, wherein the weld metal has a V-shape between the first conductor section and the second conductor section.

7. The power cable as claimed in claim 1, wherein the first metal is aluminium.

8. The power cable as claimed in claim 1, wherein the second metal is copper.

9. The power cable as claimed in claim 1, wherein the first outer metal structure comprises a plurality of elongated elements arranged in one or more layers around the first central element.

10. The power cable as claimed in claim 1, wherein the weld metal has a V-shape between the first conductor section and the second conductor section.

11. The power cable as claimed in claim 1, wherein the second conductor section is solid and comprises copper, or wherein the second conductor section consists of a plurality of elongated conducting elements, wherein all the conducting elements comprise copper.

12. The power cable as claimed in claim 1, and wherein the second conductor section comprises an elongated second central element made of the first metal and a second outer metal structure made of the second metal surrounding the second central element.

13. The power cable as claimed in claim 12, wherein the second conductor section has a second axial end section extending to the weld metal, wherein the second axial end section comprises: a central axially extending second metal member surrounded by the second outer metal structure, the second metal member including a first axial part made of the first metal and a second axial part made of the second metal, wherein the first axial part has a first end that is welded to the second central element and a second end that is welded to a first end of the second axial part, and wherein the second axial part has a second end, wherein the second end of the second axial part and the second outer metal structure are welded to the first conductor section by means of the weld metal.

14. The power cable as claimed in claim 1, comprising an insulation system comprising an inner semiconducting layer arranged around the conductor, including the weld metal, an insulation layer arranged around the inner semiconducting layer, and an outer semiconducting layer arranged around the insulation layer.

15. The power cable as claimed in claim 1, wherein the power cable is a high voltage power cable.

16. The power cable as claimed in claim 1, wherein the power cable is an AC power cable.

17. A method of jointing a conductor of a power cable, the method comprising:
a) providing a first conductor comprising a first conductor section comprising an elongated first central element made of a first metal and a first outer metal structure made of a second metal surrounding the first central element, and a second conductor comprising a second conductor section comprising the second metal, p1 b) bending the first outer metal structure radially outwards in first axial end section which forms an end portion of the first conductor section,
c) cutting off an end section of the first central element radially inwards of where the first outer metal structure is bent radially outwards to obtain a first central element end face,
d) providing a first metal member having a first axial part made of the first metal and a second axial part made of the second metal,
e) welding a first end of the first axial part to the first central element end face, the first axial part having a second end welded to a first end of the second axial part,
f) bending the first outer metal structure back radially inwards towards the first metal member, and
g) welding the second end of the second axial part and the first outer metal structure to the second conductor section by means of a weld metal.

* * * * *